US010355867B2

(12) United States Patent
Pickering et al.

(10) Patent No.: US 10,355,867 B2
(45) Date of Patent: Jul. 16, 2019

(54) GENERATING FINGERPRINTED CONTENT DATA FOR PROVISION TO RECEIVERS

(75) Inventors: Anthony Pickering, Hoofddorp (NL); Rahul Mehra, Hoofddorp (NL); Erik Hietbrink, Hoofddorp (NL)

(73) Assignee: IRDETO B.V., Hoofddorp (NL)

( * ) Notice: Subject to any disclaimer, the term of this patent is extended or adjusted under 35 U.S.C. 154(b) by 728 days.

(21) Appl. No.: 14/378,962
(22) PCT Filed: Feb. 15, 2012
(86) PCT No.: PCT/EP2012/052625
§ 371 (c)(1),
(2), (4) Date: Dec. 22, 2014
(87) PCT Pub. No.: WO2013/120525
PCT Pub. Date: Aug. 22, 2013

(65) Prior Publication Data
US 2015/0149785 A1 May 28, 2015

(51) Int. Cl.
*H04L 9/32* (2006.01)
*H04N 21/2343* (2011.01)
(Continued)

(52) U.S. Cl.
CPC ..... *H04L 9/3247* (2013.01); *H04N 21/23476* (2013.01); *H04N 21/23892* (2013.01);
(Continued)

(58) Field of Classification Search
CPC ............... H04N 7/167; H04N 21/8358; H04N 21/234345; H04N 21/23897;
(Continued)

(56) References Cited

U.S. PATENT DOCUMENTS

| 2005/0152548 | A1* | 7/2005 | Wasilewski | .......... | H04N 7/1675 380/216 |
| 2005/0169473 | A1* | 8/2005 | Candelore | ............ | A01K 11/008 380/239 |
| 2006/0222178 | A1* | 10/2006 | Kuwabara | ................. | H04L 9/12 380/201 |

FOREIGN PATENT DOCUMENTS

| EP | 2341708 A1 | 7/2011 |
| EP | 2387250 A1 | 11/2011 |

(Continued)

OTHER PUBLICATIONS

International Search Report and Written Opinion of corresponding International Application No. PCT/EP2012/052625 dated Oct. 23, 2012.

(Continued)

*Primary Examiner* — Ashokkumar B Patel
*Assistant Examiner* — Quazi Farooqui
(74) *Attorney, Agent, or Firm* — Rimon PC; Marc S. Kaufman

(57) ABSTRACT

A method for generating, from initial content data, output content data for provision to one or more receivers, wherein the initial content data is encoded according to a coding scheme, wherein for a quantity of data encoded according to the coding scheme, the coding scheme provides a mechanism for including in the quantity of encoded data additional data such that a decoder for the coding scheme, upon decoding the quantity of encoded data, does not use the additional data to generate decoded data, the method comprising: selecting one or more portions of the initial content data; for each selected portion, generating a data construct that comprises a plurality of data structures, each data structure comprising data, including a version of the selected portion, that is encrypted using a corresponding encryption process different from each encryption process used to encrypt data in the other data structures, wherein the data construct is arranged such that using a decryption process that corresponds to the encryption process for one data structure on the encrypted data in each data structure in the data construct produces a quantity of data encoded according to the coding scheme that uses the mechanism so that a decoder for the coding scheme would not use any data structure in the data construct other than said one data structure; and using the generated data constructs in the initial content data instead of their corresponding selected portions to form the output content data.

28 Claims, 9 Drawing Sheets

(51) Int. Cl.
*H04N 21/2347* (2011.01)
*H04N 21/2389* (2011.01)
*H04N 21/4405* (2011.01)
*H04N 21/8358* (2011.01)

(52) U.S. Cl.
CPC ............... *H04N 21/23897* (2013.01); *H04N 21/234345* (2013.01); *H04N 21/44055* (2013.01); *H04N 21/8358* (2013.01); *H04L 2209/608* (2013.01)

(58) Field of Classification Search
CPC ....... H04N 21/23892; H04N 21/23476; H04N 21/44055; H04L 9/00; H04L 9/3247; H04L 2209/608; H04L 9/32
USPC .................. 713/179, 150, 171, 176; 380/239
See application file for complete search history.

(56) References Cited

FOREIGN PATENT DOCUMENTS

GB          2430510 A        3/2007
WO       2011001230 A1     1/2011

OTHER PUBLICATIONS

Examination Report cited in corresponding European Application No. 12705645.5 dated Jul. 13, 2016.
Summons to attend oral proceedings pursuant to Rule 115(1) EPC dated Jun. 20, 2017 issued in European Patent application No. 12705645.5, 10 pages.

\* cited by examiner

GENERATING FINGERPRINTED CONTENT DATA FOR PROVISION TO RECEIVERS

RELATED APPLICATION DATA

This application claims priority to International Patent Application No. PCT/EP2012/052625, filed Feb. 15, 2012, the disclosure of which is hereby incorporated by reference in its entirety.

FIELD OF THE INVENTION

This invention relates to methods and systems for generating, from initial content data, output content data for provision to one or more receivers.

BACKGROUND OF THE INVENTION

Digital watermarking of content is very well known. The content may comprise any type of digital data or digital signals, and may include one or more of audio data, image data, video data, textual data, multimedia data, a web page, software products, security keys, experimental data or any other kind of data. There are many methods for performing digital watermarking of content but, in general, they all involve adding a watermark to an item of content. This involves embedding, or adding, one or more watermark symbols (or a watermark codeword or payload data) into the original item of content to form a watermarked item of content, from which the watermark symbols are decodable by a suitable corresponding watermark decoder. The watermarked item of content can then be distributed to one or more users (or recipients or receivers).

The method used for adding a watermark codeword to an item of content depends on the intended purpose of the watermark codeword. Some watermarking techniques are designed to be "robust", in the sense that the embedded watermark codeword can be successfully decoded even if the watermarked item of content has undergone subsequent processing (be that malicious or otherwise). Some watermarking techniques are designed to be "fragile", in the sense that the embedded watermark codeword cannot be successfully decoded if the watermarked item of content has undergone subsequent processing or modification. Some watermarking techniques are designed such that the difference between the original item of content and the watermarked item of content is substantially imperceptible to a human user (e.g. the original item of content and the watermarked item of content are visually and/or audibly indistinguishable to a human user). Other criteria for how a watermark is added to an item of content exist.

Digital forensic watermarking, often referred to as fingerprint watermarking or simply fingerprinting, is increasingly being used to trace or identify a particular copy of content that had been provided to one (or more) users/receivers, to thereby identify those one (or more) users/receivers. This could be used, for example, to trace users who have "leaked" their content in an unauthorized manner (such as an unauthorized online distribution or publication of content). For this type of watermarking process, respective watermark codewords are assigned to each legitimate/authorized receiver/user. Each of the receivers/users receives, or is provided access to, a copy of the original item of content with their respective watermark codeword embedded therein. Then, if an unauthorized copy of the item of content is located, the watermark codeword can be decoded from that item of content and the receiver/user that corresponds to the decoded watermark codeword can be identified.

FIG. 1 of the accompanying drawings schematically illustrates an example system in which fingerprint watermarking may be deployed. In particular, a content provider 100 is arranged to provide, or supply, content to one or more receivers 102.

The content provider 100 may be arranged to communicate with a receiver 102 over a network (not shown), so that the content provider 100 may provide the content to the receivers 102 over the network. In this case, the network may be any kind of network suitable for transmitting or communicating the content from the content provider 100 to the receivers 102. For example, the network could comprise one or more of a local area network, a wide area network, a metropolitan area network, the internet, a wireless communications network, a cable network, a digital broadcast network, a satellite communication network, a telephone network, etc. The content provider 100 may then communicate with a receiver 102 over the network via any suitable communication mechanism/protocol in order to communicate the content (and any other necessary information, such as conditional access data or digital rights management data) from the content provider 100 to the receiver 102. However, it will be appreciated that other communication scenarios are possible. For example, the content provider 100 may provide to a receiver 102 a physical medium (such as a CD, DVD, BluRay disc, etc.) storing the content. All that is important is that the content provider 100 may provide content to the receivers 102.

The content provider 100 may be any system with one or more processors arranged to provide content to the receivers 102. For example, the content provider 100 may comprise a headend system of a digital broadcast system or of a cable network system, or the content provider 100 may comprise one or more servers for transmitting, or providing access to, content over the internet.

Likewise, each receiver 102 may be any device comprising one or more processors that are arranged to receive and process content received from the content provider 100. For example, the receivers 102 may comprise one or more of a set-top-box, a personal computer, a mobile telephone, a games console, etc.

In FIG. 1, three receivers 102 are shown, but it will be appreciated that the content provider 100 may provide content to any number of receivers 102.

One of the receivers 102 is shown in more detail in FIG. 1. In particular, the receivers 102 have an associated decryption module 110 and an associated decoder module 120, as discussed below. Whilst the decryption module 110 and the decoder module 120 are shown as being part of the receiver 102, the decryption module 110 and/or the decoder module 120 may be separate from the receiver 102. For example, the decryption module 120 may be implemented, in whole or in part, within a secure decryption device (such as a smart card) removably coupled to the receiver 120. The decoder module 120 may be implemented in a separate device (such as a television set) communicably coupled to the receiver 120.

The content provider 100 may provide the content in encrypted form to the receivers 102, i.e. the content provider 100 may encrypt the content (or at least a part thereof) before communicating the content to the receivers 102. The content provider 100 may then provide one or more decryption keys to the receivers 102—the decryption module 110 of a receiver 102 is configured to use a decryption key that that receiver 102 has been provided with to decrypt an amount of encrypted content that that receiver 102 has received. In this way, access to the content may be controlled, insofar as a receiver 102 will only be able to decrypt and access content if that receiver 102 has been provided with a suitable decryption key.

There are numerous mechanisms by which decryption keys may be provided to receivers 102. For example, in digital broadcast systems, entitlement control messages (ECMs) and entitlement management messages (EMMs) are used as a mechanism for providing content decryption keys to receivers 102. As the use of ECMs and EMMs is well-known, it shall not be described in detail herein. However, in brief, control words CWs (which are decryption keys or decryption information for enabling a receiver 102 to decrypt a corresponding amount of encrypted content) are transmitted to receivers 102 in ECMs. The CWs are themselves sent in encrypted form in the ECMs. To enable a receiver 102 to access/decrypt an ECM in order to access and use the CW contained therein, the receiver 102 is provided with, and receives, an EMM. The EMM contains a decryption key $DK_1$ that enables the receiver 102 to decrypt the CWs in the ECMs (and hence obtain access to the encrypted content). The decryption key $DK_1$ is itself sent in encrypted form in the EMM. The EMM is targeted at a specific receiver 102 (or a specific set of receivers 102), in that the decryption key $DK_1$ is encrypted in the EMM using an encryption key $EK_2$ that corresponds to a decryption key $DK_2$, or product key, that is known only to that specific receiver 102 (or to that specific set of receivers 102) and that can be used to decrypt the encrypted decryption key $DK_1$. In this way, only a receiver 102 that has access the product key $DK_2$ can access the decryption key $DK_1$ contained in the EMM. In this way, control is provided over which particular receivers 102 can and cannot access encrypted content.

Other ways of communicating a decryption key to a receiver 102 may be used—for example, the receiver 102 (or an operator thereof) may contact the content provider 100 to request a decryption key (for example, requesting a suitable password over the telephone).

The content itself may be encoded using a suitable coding scheme (or standard or format). The content may have been encoded by the content provider 100, or the content provider 100 may have received already-encoded content from another source (not shown in FIG. 1). The coding scheme itself could, for example, be a data compression scheme which enables more efficient communication of the content from the content provider 100 to the receivers 102. For example: if the content comprises video data, then that video data may be encoded via any suitable video coding scheme, such as MPEG2 or MPEG4 or H264; if the content comprises audio data, then that audio data may be encoded via any suitable audio coding scheme, such as MPEG1 audio, MP3 or AAC; if the content comprises webpages, then the webpages may be encoded via HTML; if the content comprises image data, then that image data may be encoded via any suitable image coding scheme, such as JPEG, BMP, TIFF, etc. Many different coding schemes are know and the above are merely examples. The decoding module 120 of the receiver 102 is configured to decode (or interpret) content that has been encoded by one or more coding schemes. For example, if the receiver 102 is intended to process video data, then the decoder module 102 may be arranged to carry out MPEG2 decoding or MPEG4 decoding or H264 decoding; if the receiver 102 is intended to process audio data, then the decoder module 102 may be arranged to carry out MPEG1 decoding or MP3 decoding or AAC decoding; if the receiver 102 is intended to process webpages, then the decoder module 102 may be arranged to carry out HTML decoding; etc. Again, many other types of decoding processing for other coding schemes are known and could be implemented by the decoding module 120 to decode content encoded according to that coding scheme.

The content provider 100 provides encoded content, some or all of which has been encrypted, to the receivers 102. The receivers 102 use their decryption modules 110 to perform a decryption process to access (or at least try to access) encoded content; the receivers 102 also use their decoder modules 120 to decode decrypted content.

Once the content has been decrypted and then decoded, it may be output as necessary, for example, to a user via a display/monitor/screen and/or one or more audio speakers or to a storage medium to be recorded and stored thereon.

An example fingerprint watermarking process is described in European patent application EP2341708, the entire disclosure of which is incorporated herein by reference. FIG. 2 of the accompanying drawings schematically illustrates, at a high level, this fingerprint watermarking process. This fingerprint watermarking process could be applied to the example system described above with reference to FIG. 1, with the content provider 100 of FIG. 1 carrying out the fingerprint watermarking process of, and comprising the modules depicted in, FIG. 2.

In FIG. 2, there is an initial quantity of data 200 to be transmitted from the content provider 100 to a receiver 102. A portion P of data is selected from the initial quantity of data 200. The initial quantity of data 200 could, for example, be a packetized elementary stream (PES) for a digital broadcast signal, with the portion P being one of the packets in the packetized elementary stream. However, it will be appreciated that the initial quantity of data 200 may be any other form of data and/or the portion P be any other segment/section/part of the initial quantity of data 200.

A version generation module 210 generates a plurality of different versions of the portion P. In FIG. 2, n different versions of the portion P, labelled P1, P2, . . . , Pn, are generated. Each version Pi (i=1, 2, . . . , n) may be formed, for example, by watermarking a copy of the portion P via a watermarking process WMi to embed a corresponding payload (or watermark data or codeword) into the copy of the portion P. The particular manner by which the modifications, or the watermarking, is performed by the version generation module 210 is unimportant, insofar as it only matters that the n different versions can be distinguished from each other by an appropriate decoder/detector (such as a watermark decoder). However, it is preferable if the modifications/watermarks are robust and imperceptible to a human user.

Each of the modified versions P1, P2, . . . , Pn is then encrypted by an encryption operation E implemented by an encryption module 220. Each modified version Pi is encrypted using a corresponding encryption key Ki to form a corresponding encrypted portion E(Pi,Ki) (i=1, 2, . . . , n). For each encryption key Ki, there is a corresponding decryption key DKi which can be used to decrypt the encrypted portion E(Pi,Ki) to produce the modified portion Pi. As will be appreciated, given the nature of encryption algorithms, performing the decryption operation on an encrypted portion E(Pi,Ki) using a key other than the corresponding decryption key DKi (e.g. trying to carry out decryption using a key DKj where i≠j) will simply produce noise or random data.

In FIG. 2 and the subsequent drawings, data that is encrypted and data that has been encrypted and then incorrectly decrypted (so that it still remains encrypted) is shown in dotted-boxes.

A multiplexer 230 then combines or multiplexes the set of n encrypted portions E(Pi,Ki) (i=1, 2, . . . , n) and data from the initial quantity of data 200 other than the selected portion P. In particular, the original content portion P is replaced in the initial quantity of data 200 by the set of n encrypted portions E(Pi,Ki) (i=1, 2, . . . , n) to form an output quantity of data 202.

The output quantity of data may then be provided to a plurality of receivers 102 by a transmission module (not shown in FIG. 1) of the content provider 100. Each receiver 102 is provided with just one decryption key DKa from the set of decryption keys DK1, DK2, . . . , DKn. The decryption module 110 of a receiver 102 uses the decryption key DKa provided to that receiver 102 to try to decrypt each of the n encrypted portions E(Pi,Ki) in the quantity of data 202 that the receiver 102 has received. The encrypted portion E(Pa, Ka) formed using an encryption key Ka corresponding to the decryption key DKa provided to the receiver 102 is decrypted correctly, so that the receiver 102 has access to the corresponding modified version Pa. However, when the receiver 102 performs the decryption operation on each of the other encrypted portions using the decryption key DKa, the decryption operation simply outputs an amount of noise or random data. EP2341708 describes how, by suitably packaging the encrypted portions into the initial quantity of data 200 to form the output quantity of data 202, the error handling functionality implemented by the decoder module 120 of the receiver 102 essentially ignores, or removes, this noise or random data—i.e. the decoder module 120 will only use and output content that has been correctly decrypted from the encrypted portion E(Pa,Ka) that corresponds to the decryption key DKa provided to the receiver 102 and the decoder module 120 will skip over the other encrypted portions that do not correspond to the decryption key DKa provided to the receiver 102.

A plurality of portions located at different places within the initial quantity of data 200 may be handled this way (only one is shown in FIG. 2). Each receiver 102 may then be provided with a specific set of decryption keys (namely, for each portion, the receiver 102 is assigned a decryption key to enable the receiver 102 to decrypt just one of the modified versions of that portion). The resulting content output by the decoder module 120 of a receiver 102 will then contain the specific modified content portions that correspond to the specific set of decryption keys assigned to that receiver 102. In this way, content can be traced back to a particular receiver.

In the above-described fingerprint watermarking process, the encrypted portions E(Pi,Ki) (i=1, 2, . . . n) were formed using the same encryption operation (or algorithm) E but with different keys Ki (i.e. Ki≠Kj for 1≤i<j≤n). Additionally, or alternatively, the encryption operations used to generate the encrypted portions E(Pi,Ki) (i=1, 2, . . . , n) may vary from portion to portion. In other words, for 1≤i<j≤n, an encryption operation Ei may be used to generate one encrypted portion Ei(Pi,Ki) whilst a different encryption operation Ej may be used to generate another encrypted portion Ej(Pj,Kj)—in this case, the keys Ki and Kj for these encrypted portions may be different from each other or may be the same as each other. The receiver would implement a decryption operation (or algorithm) Di corresponding to one of the encryption operations Ei. As will be readily understood, using the decryption operation Di on an encrypted portion Ej(Pj,Kj) (j≠i) that has not been generated using an encryption operation Ej that does not correspond to that decryption operation Di will result in the decryption operation Di outputting an amount of noise or random data (in a similar manner to performing decryption using an incorrect decryption key). Thus, different encryption operations may be used in the process shown in FIG. 2 in place of, or in addition to, the use of different encryption keys. In general, then, all that is required is that a plurality of encrypted portions are produced, where each encrypted portion is encrypted differently (by virtue of the choice of encryption key and/or encryption operation) from each of the other encrypted portions. In other words, one modified portion is encrypted with a corresponding "encryption process" different from the encryption process used to encrypt the other modified portions. Here, the term "encryption process" relates to the pair made up of (a) the encryption operation/algorithm used and (b) the encryption key used, so that two encryption processes can differ in terms of their encryption algorithm and/or their encryption key. Similarly, an encryption process will have a corresponding decryption process that is made up of the pair comprising (a) a corresponding decryption operation/algorithm and (b) a corresponding decryption key.

Unfortunately, the error handling/concealment relied upon in the above-described method is often not specified in the various standards (e.g. the data coding standards, such as the MPEG2 standard, or the data communication standards, such as the DVB standards). For example, when the portions used are packets of a PES, then the processing carried out by a decoder module 120 in respect of wrongly decrypted PES packets is generally not specified in the various standards. Hence some decoder modules 120 (particularly older ones) may implement a different operation when they receive a PES packet that does not start with an expected/specified PES packet start pattern (such as the pattern 0x00000001 as laid out in the MPEG2 standards). This means that some receivers 102 (and their decoder modules 120) may attempt to process the information contained in the wrongly decrypted content portions instead of skipping over or ignoring those wrongly decrypted content portions. This may, at best, result in quality degradations of the decoded data, but this could also lead to a crash of the decoder module 120 itself.

SUMMARY OF THE INVENTION

Embodiments of the invention are directed towards addressing the above-mentioned deficiencies.

According to an aspect of the invention, there is provided a method for generating, from initial content data, output content data for provision to one or more receivers, wherein the initial content data is encoded according to a coding scheme, wherein for a quantity of data encoded according to the coding scheme, the coding scheme provides a mechanism for including in the quantity of encoded data additional data such that a decoder for the coding scheme, upon decoding the quantity of encoded data, does not use the additional data to generate decoded data, the method comprising: selecting one or more portions of the initial content data; for each selected portion, generating a data construct that comprises a plurality of data structures, each data structure comprising data, including a version of the selected portion, that is encrypted using a corresponding encryption process different from each encryption process used to encrypt data in the other data structures, wherein the data construct is arranged such that using a decryption process that corresponds to the encryption process for one data structure on the encrypted data in each data structure in the data construct produces a quantity of data encoded according to the coding scheme that uses the mechanism so that a decoder for the coding scheme would not use any data structure in the data construct other than said one data structure; and using the generated data constructs in the initial content data instead of their corresponding selected portions to form the output content data.

Embodiments of the invention therefore leverage the functionality of the coding scheme itself, rather than having to rely on the error correction functionality of a receiver, in order to provide the receiver with access to a single version (out of multiple versions) of a portion P of content.

In some embodiments, the mechanism of the coding scheme uses a predetermined first code and one or more predetermined second codes, such that a decoder for the coding scheme, upon decoding a quantity of data encoded according to the coding scheme, does not use data located between a first code and a corresponding following second code.

In some embodiments, for a given data structure in a data construct, the corresponding data that is encrypted using the corresponding encryption process commences with a second code so that, upon performance of the corresponding decryption process for said given data structure on the encrypted data in each data structure in that data construct, any data structure in that data construct preceding said given data structure occurs between a first code in the data construct and the decrypted second code in said given data structure.

In some embodiments, for the given data structure, the second code is part of the version of the selected portion corresponding to the given data structure.

In some embodiments, each data construct comprises a first code that precedes all of the data structures for that data construct.

In some embodiments, for a given data structure in a data construct, the corresponding data that is encrypted using the corresponding encryption process terminates with a first code, so that, upon performance of the corresponding decryption process for said given data structure on the encrypted data in each data structure in that data construct, any data structure in the data construct following said given data structure occurs between the first code in said given data structure and a corresponding subsequent second code.

In some embodiments, the subsequent second code is a second code in that data construct and located after all of the data structures in that data construct. In other embodiments, the subsequent second code is part of the initial content data following the selected portion corresponding to that data construct.

In some embodiments, generating a data construct comprises: for each data structure in the data construct and each decryption process corresponding the other data structures in the data construct, determining whether performance of said decryption process on the encrypted data in said data structure would produce one or both of the first code and the second code and, if so, regenerating said data structure by performing one or both of: changing the encryption process for encrypting data in said data structure; and modifying the data that is encrypted in said data structure.

In some embodiments, the mechanism of the coding scheme identifies said additional data as being one or more of: user data; auxiliary data; or data representing an extension to the coding scheme.

In some embodiments, the initial data is a packetized data stream and the selected portions are each one or more packets of the packetized data stream; or the initial data comprises video data and the selected portions are each one or more of: one or more video frames; one or more video fields; a part of a video frame; or a part of a video field.

In some embodiments, the method comprises, for at least one data structure, modifying the corresponding selected portion to form the version of the selected portion for said at least one data structure.

In some embodiments, the encryption processes for data structures of a data construct differ from each other by encryption keys used for the encryption processes and/or encryption algorithms used for the encryption processes.

According to a second aspect of the invention, there is provided a system arranged to generate, from initial content data, output content data for provision to one or more receivers, wherein the initial content data is encoded according to a coding scheme, wherein for a quantity of data encoded according to the coding scheme, the coding scheme provides a mechanism for including in the quantity of encoded data additional data such that a decoder for the coding scheme, upon decoding the quantity of encoded data, does not use the additional data to generate decoded data, the system comprising: a construct module arranged to generate, for each of one or more selected portions of the initial content data, a data construct that comprises a plurality of data structures, each data structure comprising data, including a version of the selected portion, that is encrypted using a corresponding encryption process different from each encryption process used to encrypt data in the other data structures, wherein the data construct is arranged such that using a decryption process that corresponds to the encryption process for one data structure on the encrypted data in each data structure in the data construct produces a quantity of data encoded according to the coding scheme that uses the mechanism so that a decoder for the coding scheme would not use any data structure in the data construct other than said one data structure; and a combiner module arranged to use the generated data constructs in the initial content data instead of their corresponding selected portions to form the output content data.

According to a third aspect of the invention, there is provided a head-end system comprising a system according to the above second aspect of the invention.

According to a fourth aspect of the invention, there is provided a computer program which, when executed by a processor, causes the processor to carry out any of the above-described methods.

BRIEF DESCRIPTION OF THE DRAWINGS

Embodiments of the invention will now be described, by way of example only, with reference to the accompanying drawings, in which.

DETAILED DESCRIPTION OF EMBODIMENTS OF THE INVENTION

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

Figure 1:
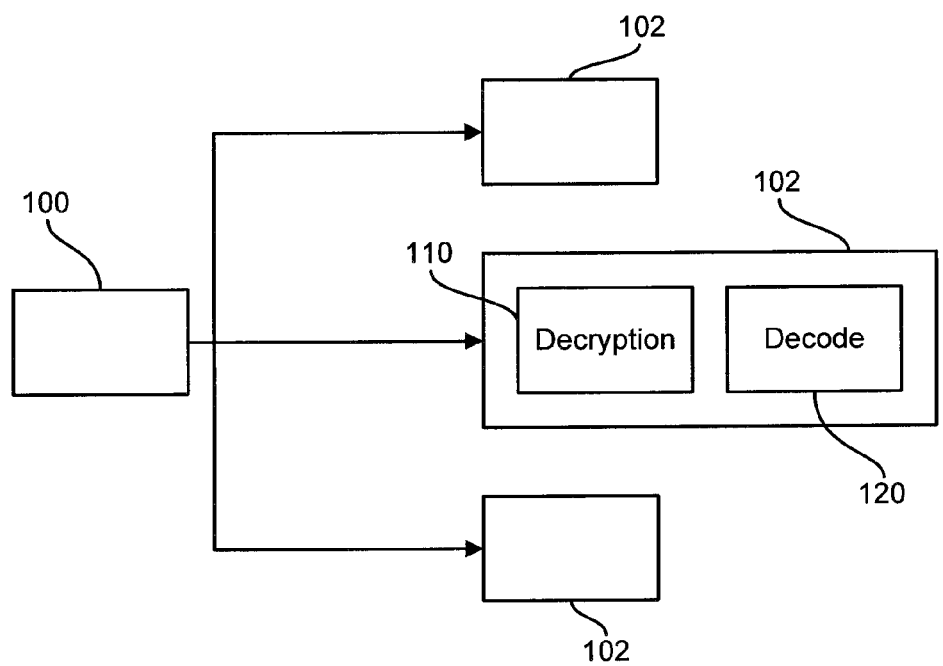
FIG. 1 schematically illustrates an example system in which fingerprint watermarking may be deployed.
Figure 2:
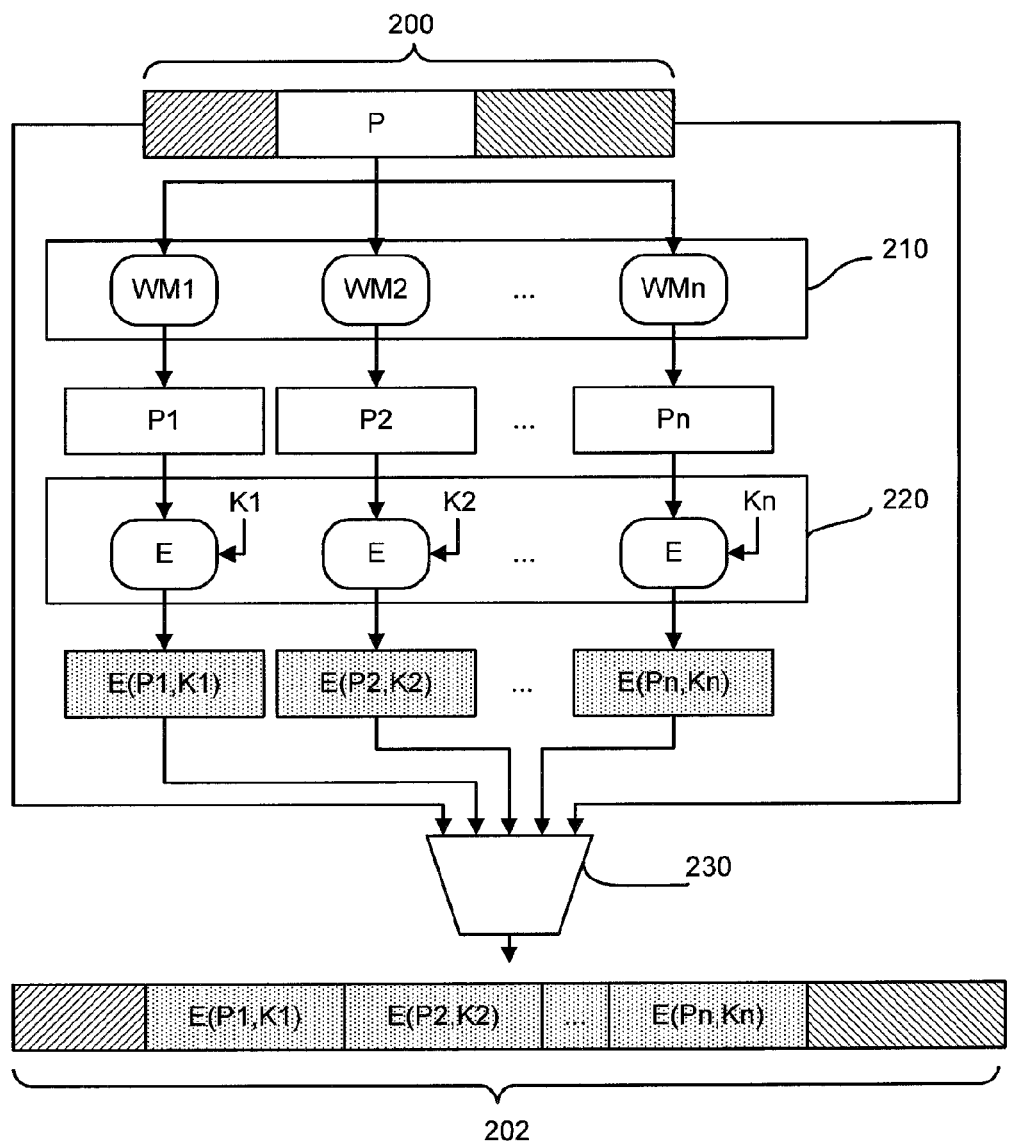
FIG. 2 schematically illustrates, at a high level, a known fingerprint watermarking process.

Embodiments of the invention provide an alternative fingerprinting scheme from that described above with respect to FIG. 2. The fingerprinting scheme according to embodiments of the invention could be applied within the example system described above with reference to FIG. 1, with the content provider 100 of FIG. 1 carrying out the fingerprinting scheme according to embodiments of the invention.

Data coding schemes (or standards or formats) specify one or more ways in which an initial amount of data is to be coded to form encoded data. A coding scheme may specify one or more predetermined codes (or control words or data patterns) which can be used within the encoded data to provide a particular signal or indication to a corresponding decoder module 120. In particular, when a decoder module 120 parses encoded data and identifies one of these codes within the encoded data, the decoder module 120 may take an appropriate action accordingly (depending on exactly what is signalled by the code). The predetermined codes are often used to delimit a particular section of encoded data—in particular, that particular section of encoded data may be immediately preceded within the encoded data by a first predetermined code (referred to herein below as a start code) and may be immediately followed by a second predetermined code (referred to herein below as an end code). For any particular start code, there may be one or more different end codes specified by the coding scheme that can be used in conjunction with that start code to delimit (or to identify or bound) a particular section of encoded data.

Figure 3A:
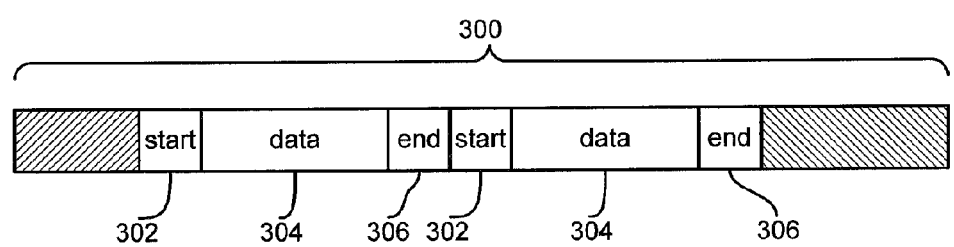
FIGS. 3a and 3b schematically illustrate encoded data that makes use of a start code and an end code.

FIG. 3a schematically illustrates encoded data 300 (i.e. data that has been encoded according to an encoding scheme) that makes use of a start code 302 and an end code 306 to delimit a corresponding portion 304 of the encoded data 300. In this way, a particular portion of data 304 may be identified to a decoder module 120 by virtue of the start code 302 and the end code 304 that surround (or encompass) that portion 304.

Figure 3B:
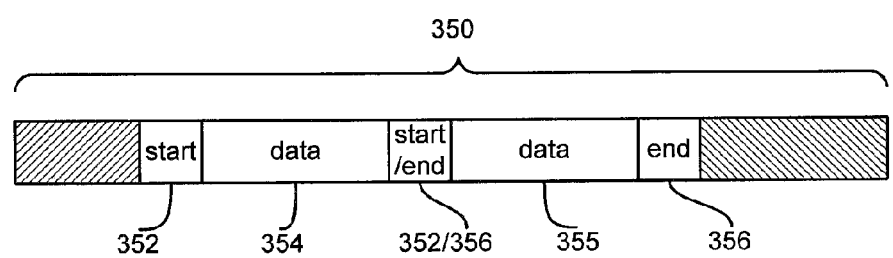

The end code that cooperates with a start code may itself be a start code for a subsequent portion of encoded data. FIG. 3b schematically illustrates encoded data 350 (i.e. data that has been encoded according to an encoding scheme) that makes use of a start code 352 and an end code 356 to delimit a corresponding portion 354, 355 of the encoded data. As shown in FIG. 3b, the end code 356 for one portion of data 354 may be a start code 352 for a subsequent portion of data 355.

Some decoder modules 120 are arranged to not process data that is delimited between a particular start code and a corresponding end code. As mentioned above, there may be one more possible end codes that can be used in conjunction with such a start code. One example is a start code that indicates that subsequent data is so-called "user data" or "auxiliary data"—for example, in the MPEG2 video format, the start code 0x000001B2 is used to indicate that subsequent data is user data which a decoder module 120 may ignore, with an end code of 0x000001 being used to indicate the end of the user data section. Another example is the use of a start code and an end code to identify data that corresponds to a future extension of the coding scheme—in this way, a legacy decoding module 120 that is not configured to handle the extended coding scheme will ignore data related to the extended coding scheme when this data is identified between the extension start code and end code. It will be appreciated that other similar start codes and corresponding end codes may exists within other coding schemes such that a corresponding decoder module 120 that is arranged to decode data encoded according to that coding scheme does not process a quantity of data delimited between such a start code and such an end code. In the following, any such start code and end code for a coding scheme that cause a corresponding decoding module 120 to behave this way shall be referred to as an SC and an EC respectively.

Figure 4:
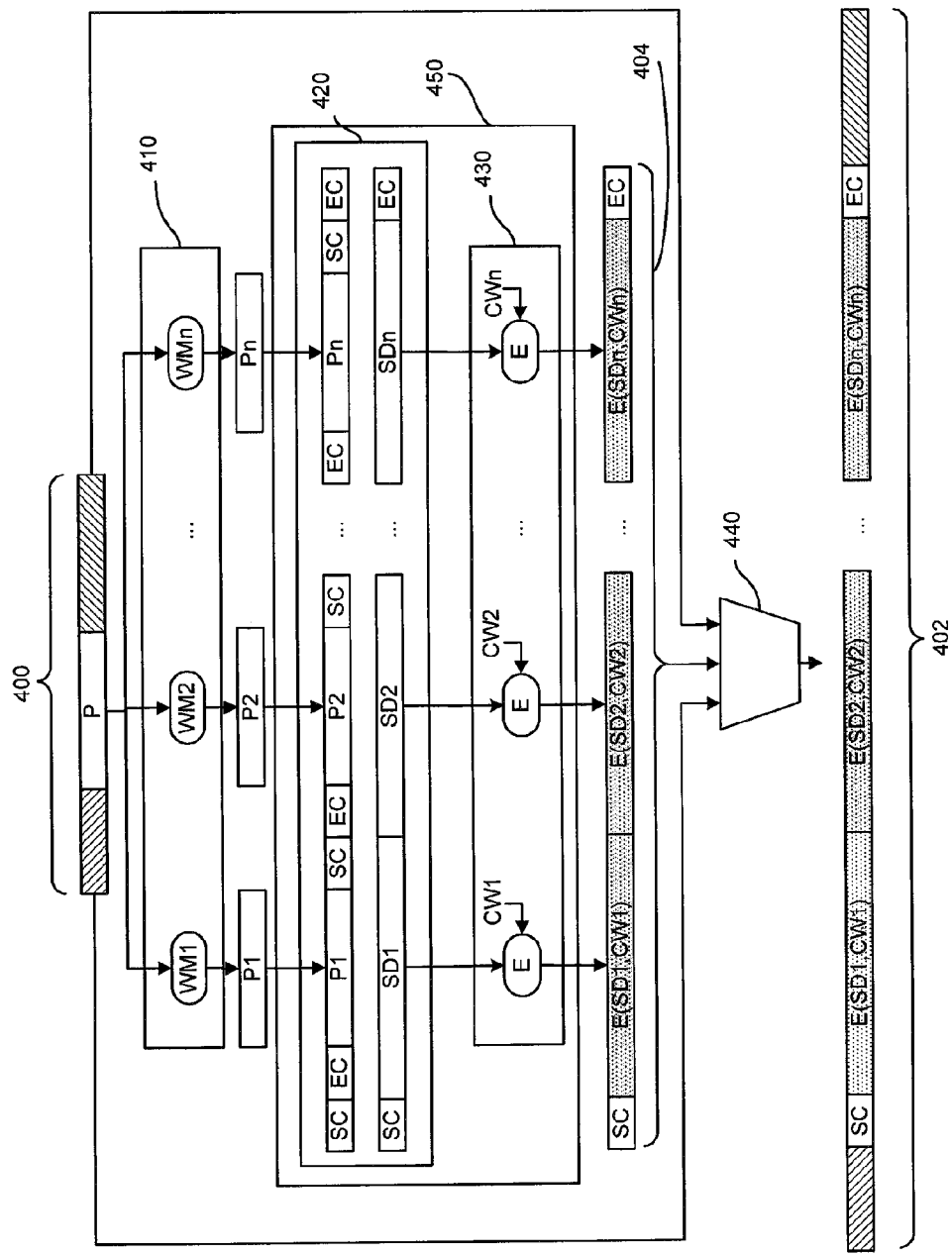
FIG. 4 schematically illustrates a fingerprint watermarking process according to an embodiment of the invention.
Figure 5:
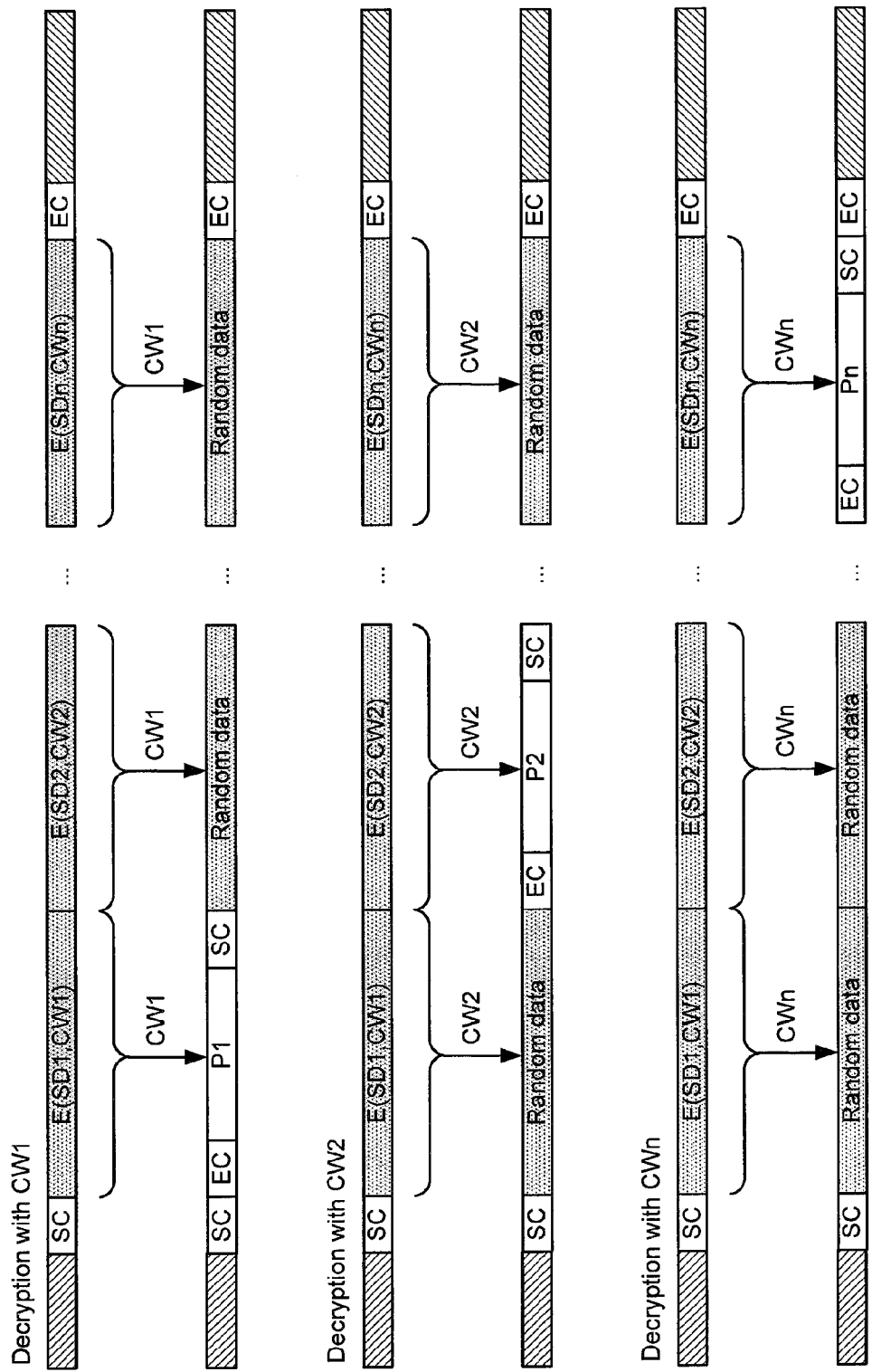
FIG. 5 schematically illustrates how a receiver may handle content produced by the fingerprint watermarking process of FIG. 4.

FIG. 4 schematically illustrates a fingerprint watermarking process according to an embodiment of the invention, with FIG. 5 schematically illustrating how a receiver 102 handles content produced by the fingerprint watermarking process of FIG. 4. The fingerprint watermarking process of FIG. 4 could be applied to the example system described above with reference to FIG. 1, with the content provider 100 of FIG. 1 carrying out the fingerprint watermarking process of, and comprising the modules depicted in, FIG. 4 (instead of those depicted in FIG. 2).

In FIG. 4, there is an initial quantity of data 400 to be provided by the content provider 100 to a receiver 102. A portion P of data is selected from the initial quantity of data 400. The initial quantity of data 400 could, for example, be a packetized elementary stream (PES) for a digital broadcast signal, with the portion P being one of the packets in the packetized elementary stream. However, it will be appreciated that the initial quantity of data 400 may be any other form of data and/or the portion P be any other segment/section/part of the initial quantity of data 400.

A version generation module 410 generates a plurality of different versions of the portion P. In FIG. 4, n different versions of the portion P, labelled P1, P2, . . . , Pn, are generated. Each version, or modified portion, Pi (i=1, 2, . . . , n) may be formed, for example, by watermarking a copy of the portion P via a watermarking process WMi to embed a corresponding payload (or watermark data or codeword) into the copy of the portion P. The particular manner by which the modifications, such as watermarking, are performed by the version generation module 410 is unimportant, insofar as it only matters that the n different versions can be distinguished from each other by an appropriate decoder/detector (such as a watermark decoder). However, it is preferable if the modifications/watermarks are robust and imperceptible to a human user.

A structuring module 420 forms an initial data construct which comprises:

(a) an SC; followed by (b) for each of the modified portions Pi (i=1, 2, . . . , n), a corresponding data structure SDi that includes an SC, an EC and the modified portion Pi, with the EC preceding the modified portion Pi and the modified portion Pi preceding the SC within the data structure SDi; followed by (c) an EC that terminates the initial data construct.

Each data structure SDi may contain extra data in addition to the corresponding EC, SC and modified portion Pi mentioned above.

An encryption module 430 encrypts data in each of the data structures SDi (i=1, 2, ..., n) using an encryption operation E. In particular, the encryption module 430 encrypts at least the corresponding EC, SC and modified portion Pi of the data structure SDi (i=1, 2, ..., n). The encryption of data in each data structure SDi is carried out using a corresponding encryption key or control word CWi to form a corresponding encrypted data structure E(SDi, CWi) (i=1, 2, ..., n). The n different control words CWi (i=1, 2, ..., n) are different from each other.

For each encryption key CWi (i=1, 2, ..., n), there is a corresponding decryption key DKi which can be used to decrypt the encrypted data in the encrypted data structure E(SDi,CWi) to re-produce the original data structure SDi. In the embodiment being illustrated with reference to FIGS. 4 and 5, the encryption operation E involves a symmetric encryption algorithm (such as the Advanced Encryption Standard), so that the decryption key DKi equals the encryption key CWi—however, it will be appreciated that this is not necessary and embodiments of the invention are not limited in this way.

As will be appreciated, given the nature of encryption algorithms, performing the corresponding decryption operation on encrypted data in an encrypted data structure E(SDi, CWi) (i=1, 2, ..., n) using a key other than the corresponding decryption key DKi (e.g. trying to carry out decryption using a decryption key DKj where i≠j) will simply produce noise or random data.

If a data structure data structure SDi (i=1, 2, ..., n) contains extra data in addition to the corresponding EC, SC and modified portion Pi, then the encryption module 430 may be configured to encrypt that additional data too, but this is not essential.

Thus, the structuring module 420 and the encryption module 430 cooperate to generate an output data construct 404 that comprises:

(a) an SC; followed by (b) for each of the modified portions Pi (i=1, 2, ..., n), a corresponding data structure E(SDi,CWi) that includes encrypted data, including an encrypted modified portion Pi along with an encrypted SC and an encrypted EC; followed by (c) an EC that terminates the output data construct 404.

It will be appreciated that the structuring module 420 and the encryption module 430 may cooperate in different ways to form an equivalent output data construct 404. For example, the ECs and/or the SCs and/or the modified portions Pi may be encrypted prior to arranging them into data structures SDi and/or prior to arranging them into a data construct. Thus, the order of the processing illustrated in FIG. 4 is merely illustrative. The structuring module 420 and the encryption module 430 are therefore shown in FIG. 4 as being part of a construct module 450 that is arranged to produce the output data construct 404 from the modified portions P1, P2, ..., Pn.

A multiplexer 440 then combines or multiplexes this output data construct 404 with data from the initial quantity of data 400 other than the selected portion P (namely any data preceding the selected portion P and any data following the selected portion P in the initial quantity of data). In particular, an output quantity of data 402 is which is equivalent to initial quantity of data 400 with the original content portion P replaced by the output data construct 404. In other words, the output data construct 404 is used in the initial quantity of data 400 instead of the corresponding selected portion P to form the output quantity of data 402.

The output quantity of data 402 may then be provided to a plurality of receivers 102 by a transmission module of the content provider 100.

FIG. 5 schematically illustrates how the decryption module 110 and the decoder module 120 of a receiver 102 are configured to process the output quantity of data 402 produced by the embodiment shown in FIG. 4 that is provided to, and received by, the receiver 102 according to an embodiment of the invention.

Each receiver 102 is provided with just one decryption key DKa from the set of decryption keys DK1, DK2, ..., DKn. As mentioned above, in the embodiment illustrated in FIG. 5, the decryption key DKa equals the control word CWa, but this need not necessarily be the case.

The decryption module 110 of a receiver 102 is arranged to use the decryption key CWa provided to that receiver 102 to try to decrypt the encrypted data in the output data construct 404 in the quantity of data 402 that the receiver 102 has received. In particular, the decryption module 110 performs, for each of the encrypted data structures E(SDi, CWi) (i=1, 2, ..., n), a decryption operation (corresponding to the encryption operation E of FIG. 4) on the encrypted data in that encrypted data structure E(SDi,CWi) using the decryption key CWa provided to the receiver 102. The encrypted data in the encrypted data structure E(SDa,CWa) formed using the control word CWa provided to the receiver 102 is decrypted correctly, so that the receiver 102 has access to the corresponding modified version Pa. However, when the decryption module 110 performs the decryption operation on the encrypted data in each of the other encrypted data structures using the decryption key CWa, the decryption operation simply outputs an amount of noise or random data. The result of this decryption, together with the positioning of the SCs and ECs in the output data construct 404, means that any modified portion Pi other than the modified portion Pa corresponding to the decryption key CWa occurs between a first code and a corresponding second code. In this way, the receiver 102 is only provided access to a single modified portion—the other modified portions remain (at least at that time) unaccessible to the receiver 102 and are ignored by the decoder module 120 due to the use of the SCs and ECs. In other words, the output from the receiver 102 is generated by processing a single modified portion (i.e. the correctly decrypted one)—the other modified portions remain present in the data stream but the output from the receiver 102 is not based on processing these other modified portions.

Referring to FIG. 5, if the receiver 102 is provided with decryption key CW1, then when the decryption module 110 performs the decryption operation on the encrypted data in each of the encrypted data structures using the decryption key CW1, the decryption operation correctly decrypts the encrypted data in the encrypted data structure E(SD1,CW1) and transforms the other encrypted data structures into an amount of noise or random data. The SC at the beginning of the output data structure 404 now corresponds to the EC at the beginning of the correctly decrypted data structure SD1, so that any data between this SC and EC (none shown in FIG. 5) is ignored by the decoder module 120. The decoder module 120 will process the corresponding modified portion P1. The SC at the end of the correctly decrypted data structure SD1 now corresponds to the EC at the end of the output data structure 404, so that any data between this SC and EC (namely the other data structures, including the various amounts of random data or noise produced by incorrectly decrypting the encrypted data in the other encrypted data structures) is ignored by the decoder module 120. Hence, the decoder module 120 (and the receiver 102) is provided access to a (single) modified portion P1—the other modified portions remain encrypted and are not used by the decoder module 120 to generate an output for the receiver 102.

Similarly, as shown in FIG. 5, if the receiver 102 is provided with decryption key CW2, then when the decryption module 110 performs the decryption operation on the encrypted data in each encrypted data structure using the decryption key CW2, the decryption operation correctly decrypts the encrypted data in the encrypted data structure E(SD2,CW2) and transforms the other encrypted data structures into an amount of noise or random data. The SC at the beginning of the output data structure 404 now corresponds to the EC at the beginning of the correctly decrypted data structure SD2, so that any data between this SC and EC (namely the noise or random data produced from incorrectly decrypting encrypted data in the preceding encrypted data structure E(SD1,CW1)) is ignored by the decoder module 120. The decoder module 120 will process the corresponding modified portion P2. The SC at the end of the correctly decrypted data structure SD2 now corresponds to the EC at the end of the output data structure 404, so that any data between this SC and EC (namely the later data structures, including the various amounts of random data or noise produced by incorrectly decrypting the encrypted data in these later encrypted data structures) is ignored by the decoder module 120. Hence, the decoder module 120 (and the receiver 102) is provided access to a single (modified) portion P2—the other modified portions remain encrypted and are not used by the decoder module 120 to generate an output for the receiver 102.

The similar situation is illustrated in FIG. 5 when the receiver is provided with the decryption key CWn.

As mentioned above with reference to FIG. 3b, in some encoding schemes the end code that cooperates with a start code may itself be a start code for a subsequent portion of encoded data. Thus, in some embodiments, the portion P that is selected may start with a start code for that portion P—i.e. the portion P already comprises a start code for that portion P—and this start code may be an EC. An embodiment of the invention that deliberately selects portions P that commence with their own start code that is also an EC is illustrated in FIGS. 6 and 7.

Figure 6:
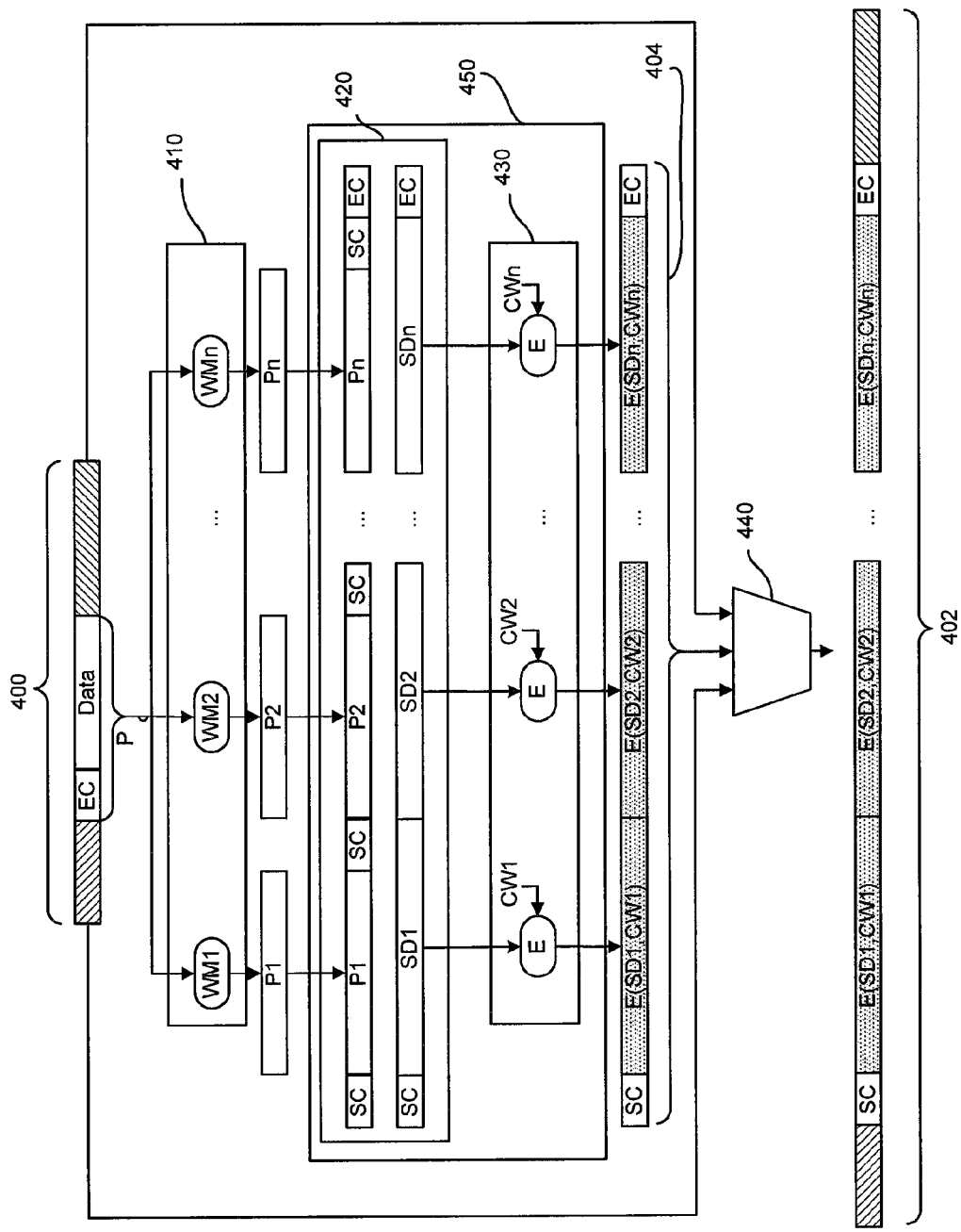
FIG. 6 schematically illustrates a fingerprint watermarking process according to an embodiment of the invention.
Figure 7:
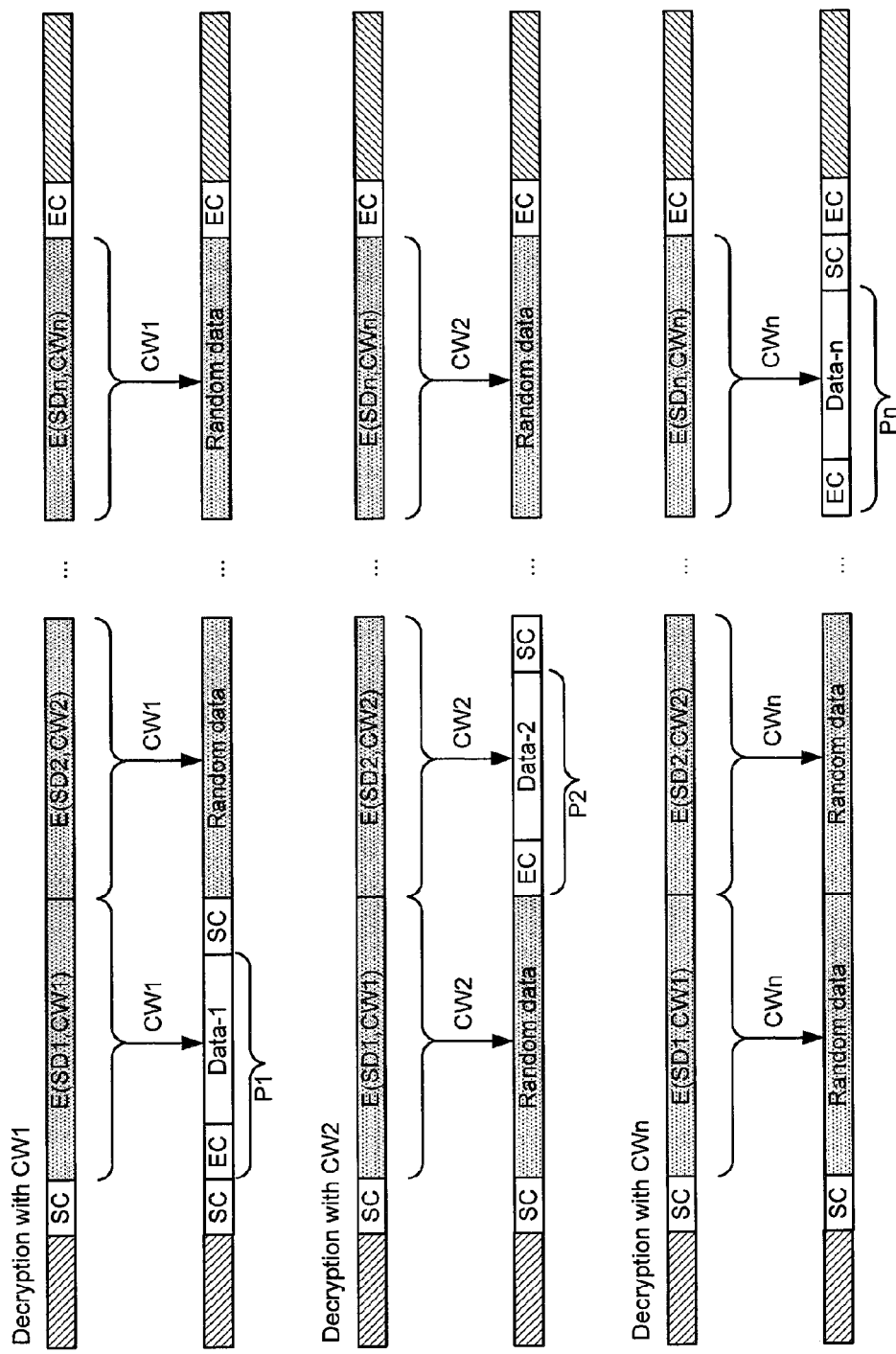
FIG. 7 schematically illustrates how a receiver may handle content produced by the fingerprint watermarking process of FIG. 6.

FIG. 6 is the same as FIG. 4, except that the selected data portion P is shown as comprising a section of data that follows an EC—here, the EC serves as a start code for the section of data.

The version generation module 410 generates the n modified portions P1, P2, . . . , Pn without modifying the EC of the selected portion P, i.e. each modified portion Pi (i=1, 2, . . . , n) commences with the EC and has a modified version (Data-i) of the section of data in the selected portion P.

The structuring module 420 in FIG. 6 operates in the same way as the structuring module 420 in FIG. 4 except that an EC is not included prior to the modified portion Pi in the data structures SDi (i=1, 2, . . . , n)—this is because the modified portions Pi already commence with an EC. Thus, the structuring module 420 forms an initial data construct which comprises:
  (a) an SC; followed by
  (b) for each of the modified portions Pi (i=1, 2, . . . , n), a corresponding data structure SDi that includes the modified portion Pi and an SC following the modified portion Pi; followed by
  (c) an EC that terminates the initial data construct.

The remainder of the processing shown in FIG. 6 is then the same as that shown in, and described above with reference to, FIG. 4.

FIG. 7 schematically illustrates how the decryption module 110 and the decoder module 120 of a receiver 102 are configured to process the output quantity of data 402 produced by the embodiment shown in FIG. 6 that is provided to, and received by, the receiver 102 according to an embodiment of the invention. The processing shown in FIG. 7 is the same as the processing shown in FIG. 5. However, in FIG. 5, the correct decryption of the encrypted data in an encrypted data structure E(SDa,CWa)—due to the receiver having been provided with decryption key CWa—results in the EC in the initial portion P (which also exists in the accessed modified portion Pa) acting as an EC for the SC the commences the output data construct 604. Moreover, the EC in the initial portion P also acts as a start code for the modified section of data (Data-a) in the modified portion Pa. The SC the ends the accessed data structure SDa now corresponds to the EC that terminates the output data construct 604. The result of this decryption, together with the positioning of the SCs and ECs in the output data construct 404, means that any modified portion Pi other than the modified portion Pa corresponding to the decryption key CWa occurs between a first code and a corresponding second code. In this way, the receiver 102 is only provided access to a single modified portion—the other modified portions remain unaccessible and are ignored by the decoder module 120 due to the use of the SCs and ECs.

Figure 8:
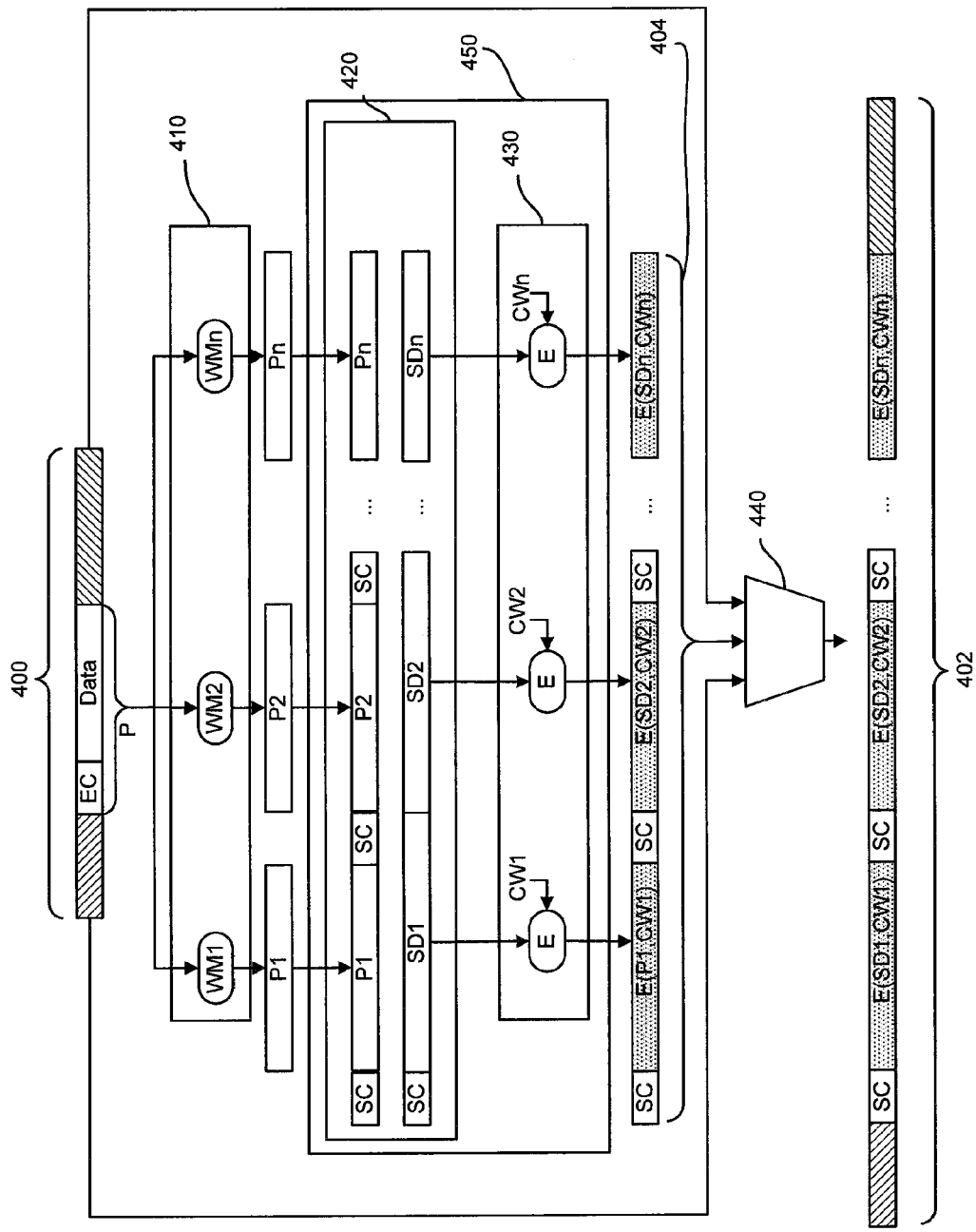
FIG. 8 schematically illustrates a fingerprint watermarking process according to an embodiment of the invention.
Figure 9:
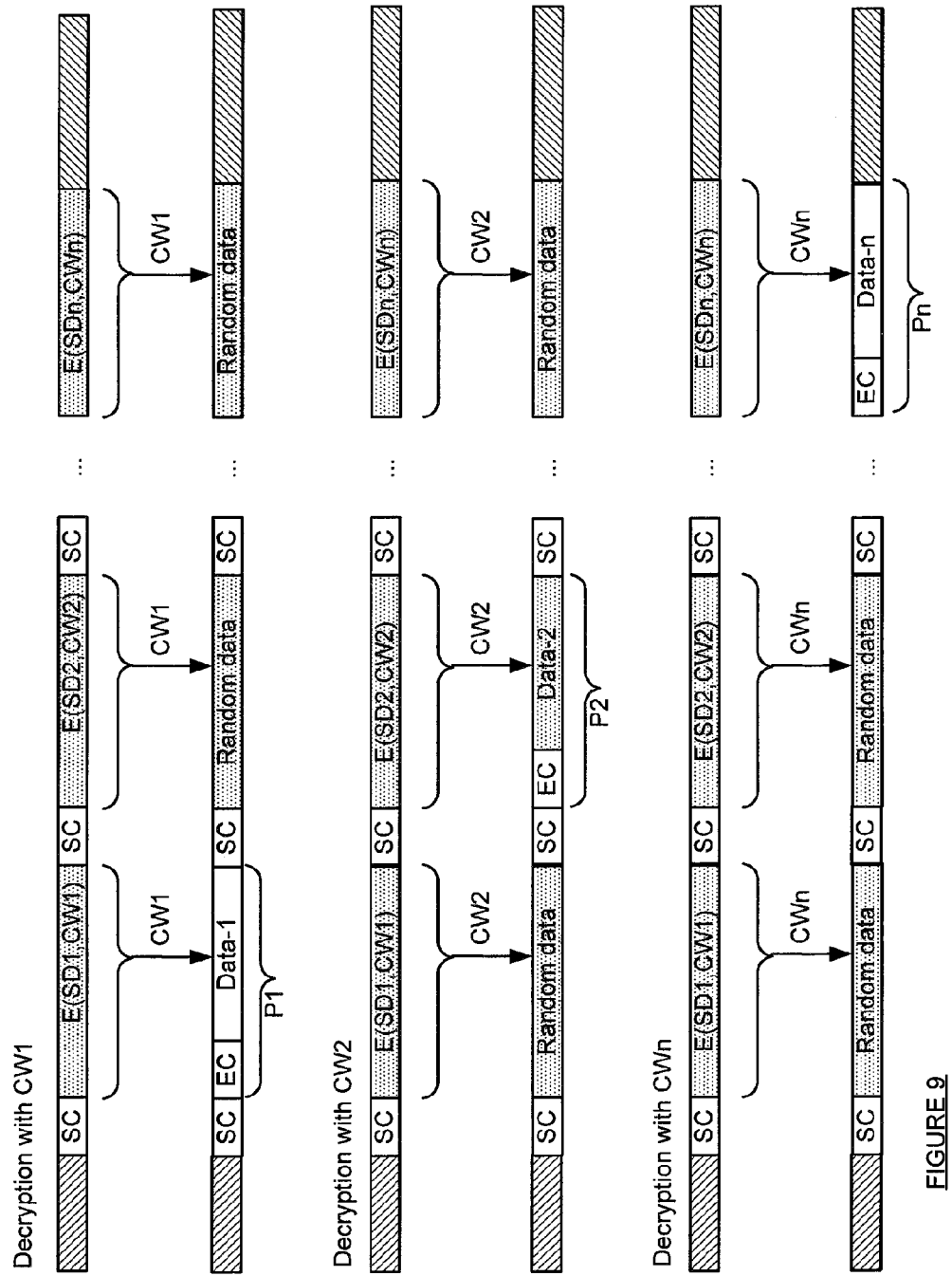
FIG. 9 schematically illustrates how a receiver may handle content produced by the fingerprint watermarking process of FIG. 8.

Indeed, when an SC can also be used as an EC for an SC, then the processing illustrated in FIGS. 6 and 7 may be modified, as shown in FIGS. 8 and 9 respectively, so that the encryption module 420 does not encrypt the SC located at the end of each data structure SDi (i=1, 2, . . . , n).

It will be appreciated that the EC at the end of output data construct 404 may be omitted (as illustrated in FIG. 8) if the data in the initial quantity of data 400 that follows the selected portion P itself commences with an EC (for example, when that EC acts as a start code for a section of data following the selected portion P).

It will be appreciated that various combinations of the above-described embodiments may be implemented. Additionally, the definition of exactly what is called a "data structure" may be varied. For example, the data structure SD1 containing the portion P1 may be considered to additionally contain the SC at the beginning of the initial data construct (with this SC then not being encrypted by the encryption module 420 when processing the data structure SD1 to form the encrypted data structure E(SD1,CW1)); and/or the data structure SDn containing the portion Pn may be considered to additionally contain the EC at the end of the initial data construct (with this EC then not being encrypted by the encryption module 420 when processing the data structure SDn to form the encrypted data structure E(SDn, CWn)).

A plurality of portions located at different places within the initial quantity of data 400 may be handled this way (only one is shown in FIGS. 4-9). Each receiver 102 may then be provided with a specific set of decryption keys (namely, for each portion, the receiver 102 is assigned a decryption key to enable the receiver 102 to access just one of the corresponding modified portions). The resulting content output by the decoder module 120 of a receiver 102 will then contain the specific modified content portions that correspond to the specific set of decryption keys assigned to that receiver 102. In this way, the output from the receiver's 102 decoder module 120 can be traced back to that receiver 102. In some embodiments, the number of modified portions produced for one selected portion may be different from the number of modified portions produced for another selected portion.

The encryption module 420 may be configured to check that the decryption that would be performed by the decryption module 120 in a receiver will not inadvertently create, in the wrongly decrypted data, an SC and/or an EC and/or some other pattern of bits that would prematurely indicate an end or termination of the wrongly decrypted data. In particular, the encryption operation E tries to remove any correlation between the initial data (the cleartext) and the encrypted data (or ciphertext). This property makes the encryption operation E equivalent to a (pseudo) random noise generator, and this means that all particular bit sequences are equally likely for the ciphertext. The same applies to the corresponding decryption operation and, in particular, decrypting ciphertext with an incorrect decryption key is also equivalent to a (pseudo) random noise generator, and this means that all particular bit sequences are equally likely for the incorrectly decrypted ciphertext. It would be undesirable for the decryption module 110 to generate an SC and/or an EC when decrypting encrypted data in an encrypted data structure E(SDi,CWi) using a decryption key CWj that does not correspond to that encrypted data structure, as such an inadvertently generated SC and/or EC could disturb the pattern of SCs and ECs after the decryption process has been performed and the decoder module 120 may then interpret the output from the decryption module 110 in a manner other than intended.

Thus, for each of the n data structures SDi (i=1, 2, . . . , n), the encryption module 430 may be arranged, for each of the decryption keys CWj (j=1, 2, . . . , n and j≠i) other that the corresponding decryption key CWi, to carry out the decryption operation using that decryption key CWj on the encrypted data in the encrypted data structure E(SDi,CWi). This involves n(n−1) separate decryption processes as there are n(n−1) combinations of encrypted data structures E(SDi, CWi) and non-corresponding decryption keys CWj. The encryption module 430 may then check whether, for any encrypted data structure E(SDi,CWi), the decryption of the encrypted data in that encrypted data structure E(SDi,CWi) using a non-corresponding decryption key CWj produces a bit pattern that a decoder module 120 might interpret as an SC and/or an EC.

If this check identifies that such a bit pattern is produced when the encrypted data in an encrypted data structure E(SDi,CWi) is decrypted using a non-corresponding decryption key CWj, then the processing for that data structure SDi may be modified.

This modification of the processing may involve a first form of modification that comprises changing the encryption key CWi for that data structure SDi to a different encryption key CWi'. The above checks are then performed for the new encrypted data structure E(SDi,CWi'), which will be different from the previous encrypted data structure E(SDi, CWi).

This modification of the processing may involve a second form of modification that comprises changing the data that is to be encrypted in the data structure SDi, to form a changed data structure SDi', and then encrypting the changed data structure SDi' using the encryption key CWi. This generates a new encrypted data structure E(SDi',CWi), which will be different from the previous encrypted data structure E(SDi, CWi). Changing the data in the data structure SDi that is to be encrypted may comprise one or more of: including another SC at the end of the data structure SDi; including data (would could be random data) prior to the EC at the start of the data structure SDi; changing how the modified portion Pi is generated, so that a new modified portion Pi' is used instead; modifying some of the content of the modified portion Pi (e.g. by including various encoding fields or codes into the modified portion Pi); or any other suitable change to the data that is to be encrypted.

The above first form of modification and second form of modification may be used separately or in conjunction with each other.

The benefit of the first form of modification mentioned above is that there is no change in the content packaging. However, the downside of the first form of modification is that decryption modules 110 in receivers 102 may need to receive the new encryption key CWi' before they can perform their decryption operation—depending on the system configuration, this can could cause an unwanted delay. Therefore, in some embodiments, the second form of modification may be preferable.

Examples of SCs and ECs are given below:

For the MPEG2 video format:
  The SC could be a user data start code=0x000001 B2 and the EC could then be an end code=0x000001 (i.e. the beginning bit-pattern for any next start code in the MPEG2 video format, sometimes referred to as the start-code-prefix)
  The SC could be an extension start code=0x000001 B5 and the EC could then be an end code=0x000001 (i.e. the beginning bit-pattern for any next start code in the MPEG2 video format)

For the H264 video format:
  The SC could be a Network Abstraction Layer (NAL) start code indicating a NAL nal_unit_type equal to any one of 0, 13-19, or 24-31 and the EC could then be any next NAL start code.

For the MPEG2 PES packet format:
  The SC could be a PES packet with a header configured with a length value of 0 (undefined PES packet length) and a Stream_ID set to any of a Reserved stream or Private stream value and the SC could then be the packet start code prefix of a next PES packet.

For some coding schemes, the SCs and/or ECs need to be suitably located within the encoded data. For example, an SC or an EC may need to be byte-aligned. Consequently, the structuring module 410 may be arranged to form the initial data construct such that the SCs and ECs are located in the initial data construct at suitable positions so that those SCs and ECs will be suitably located (according to the coding scheme) in the output quantity of data 404 and would be interpreted by a decoder module 120 as an SC or EC.

As mentioned above, the portion P of data that is selected from the initial quantity of data 400 may be any suitable portion P. For example:

If the initial quantity of data is a packetized data stream, then the portion P may be a packet of the packetized data stream.

If the initial quantity of data comprises encoded video data, then the portion P may comprise one or more video frames or video fields, or a part (such as one or more slices or macroblocks) of a video frame or of a video field.

The portion P may be selected so that it commences with a start code (and possibly terminated with an end code), although these need not necessarily be an SC (or an EC). Sometimes, though, the portion P may be selected so that it commences with a start code that is an EC (as in FIG. 6).

More generally, a coding scheme may provide a mechanism for including in a quantity of encoded data (encoded according to the coding scheme) additional data such that a decoder for the coding scheme, upon decoding the quantity of encoded data, does not use the additional data. In the above-described embodiments, the mechanism of the coding scheme uses an SC and one or more ECs, such that a decoder for the coding scheme, upon decoding a quantity of data encoded according to the coding scheme, does not use data located between an SC and a corresponding following EC. The principle underlying the invention is that the output data construct 404 produced by the construct module 450 is arranged such that, upon performance of a decryption process on the encrypted data in each data structure in the data construct using a decryption key corresponding to one of the data structures, a decoder for the coding scheme would not use any data structure in the data construct other than that one of the data structures due to the mechanism of the coding scheme. In other words, the embodiments of the invention leverage the functionality of the coding scheme itself and/or of the decoding operation performed by the decoder module 120, rather than relying on the error correction functionality of the receiver 102, so that the decryption module 110 and the decoder module 120 provide the receiver 102 with access to a single version of a portion P.

For example, for a PES, a PES packet could be included into the PES that (a) has a header that indicates that that PES packet is of a "private stream type", so that a decoder module would ignore the contents/payload of that PES packet; (b) has the length field set to be 0 that indicates that the packet is of variable length; and (c) uses the packet start-code-prefix of the next PES packet to signal the end of the packet.

The above-mentioned checking process may then be adapted according to the specific mechanism of the coding scheme, so that decryption of encrypted data with an incorrect decryption key does not invoke the mechanism of the coding scheme to cause a decoder module 120 to either not use encoded data that is intended for use and/or use encoded data that is not intended for use.

In the above-described embodiments, the encryption module 430 encrypts data in each of the data structures SDi (i=1, 2, . . . , n) using the same encryption operation (or algorithm) E but with different keys CWi (i.e. CWi≠CWj for 1≤i<j≤n). Additionally, or alternatively, the encryption operations used to generate the encrypted data structures E(SDi,CWi) (i=1, 2, . . . , n) may vary from data structure to data structure. In other words, for 1≤i<j≤n, an encryption operation Ei may be used to generate one encrypted data structure Ei(SDi,CWi) whilst a different encryption operation Ej may be used to generate another encrypted data structure Ej(CWj,CWj)—in this case, the keys CWi and CWj for these encrypted data structures may be different from each other or may be the same as each other. The receiver would implement a decryption operation (or algorithm) Di corresponding to one of the encryption operations Ei. As will be readily understood, using the decryption operation Di on an encrypted data structure Ej(SDj,CWj) (j≠i) that has been generated using an encryption operation Ej that does not correspond to that decryption operation Di will result in the decryption operation Di outputting an amount of noise or random data (in a similar manner to performing decryption using an incorrect decryption key). Thus, different encryption operations may be used in the above-described embodiments in place of, or in addition to, the use of different encryption keys. In general, then, all that is required is that a plurality of encrypted data structures are produced, where each encrypted data structure comprises data encrypted differently (by virtue of the choice of encryption key and/or encryption operation) from the data encrypted in each of the other encrypted data structures. In other words, the data encrypted in one encrypted data structure is encrypted with a corresponding "encryption process" different from the encryption process used to encrypt data in each of the other encrypted data structures. Here, the term "encryption process" relates to the pair made up of (a) the encryption operation/algorithm used and (b) the encryption key used, so that two encryption processes can differ in terms of their encryption algorithm and/or their encryption key. Similarly, an encryption process will have a corresponding decryption process that is made up of the pair comprising (a) a corresponding decryption operation/algorithm and (b) a corresponding decryption key. It will, therefore, be appreciated that, where reference is made to using different encryption keys, embodiments of the invention may be equally implemented using different encryption operations/algorithms and/or different encryption processes.

In some embodiments, the version generation module 410 does not modify the initial portion P when producing the portions Pi (for i=1, 2, . . . , n), i.e. Pi=P (for i=1, 2, . . . , n). Thus, the version generation module 410 may simply produce copies of the initial portion P (or, indeed, the version generation module 410 may be omitted and the structuring module 420 may then simply refer to the initial portion P from the initial quantity of data 400). This is of particular use when the encrypted data structures are generated using different encryption operations. In particular, different receivers may be configured to use different decryption operations—e.g. some may be old receivers with old decryption operations and some may be newer receivers when newer decryption operations, or some may be receivers with a decryption operation stipulated by one conditional access provider whilst others may be receivers with a different decryption operation stipulated by a different conditional access provider. By having Pi=P for (i=1, 2, . . . , n), and by having the encryption module 430 arranged to encrypt the data structures SDi (i=1, 2, . . . , n) with different encryption operations, each corresponding to a respective one of the decryption operations implemented by a receiver in a target set of receivers, then all of the receivers in the target set of receivers will be able to process the received output quantity of data 402 and successfully access the portion P (by successfully decrypting the encrypted data structure that was encrypted using the encryption operation corresponding to the decryption operation implemented in the receiver and by the decoder module not making use of encrypted data structures that were encrypted using a different encryption operation and hence which are decrypted into noise or random data by the receiver).

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality and modules may be implemented as hardware and/or software. For example, the above-mentioned modules may be implemented as one or more software components for execution by a processor of the system. Alternatively, the above-mentioned modules may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements.

It will be appreciated that, insofar as embodiments of the invention are implemented by a computer program, then a storage medium and a transmission medium carrying the computer program form aspects of the invention. The computer program may have one or more program instructions, or program code, which, when executed by a computer carries out an embodiment of the invention. The term "program," as used herein, may be a sequence of instructions designed for execution on a computer system, and may include a subroutine, a function, a procedure, an object method, an object implementation, an executable application, an applet, a servlet, source code, object code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A method, implemented by one or more computer processors, for generating, from initial content data, output content data for provision to one or more receivers, wherein the initial content data is encoded according to a coding scheme, wherein for a quantity of data encoded according to the coding scheme, the coding scheme provides a mechanism for including in the quantity of encoded data additional data such that a decoder for the coding scheme, upon decoding the quantity of encoded data, does not use the additional data to generate decoded data, the method comprising:
   selecting one or more portions of the initial content data;
   for each selected portion, generating a data construct that comprises a plurality of data structures, each data structure comprising data, including a version of the selected portion, that is encrypted using a corresponding encryption process different from each encryption process used to encrypt data in the other data structures, wherein the data construct is arranged such that using a decryption process that corresponds to the encryption process for one data structure on the encrypted data in each data structure in the data construct produces a quantity of data encoded according to the coding scheme that uses the mechanism so that a decoder for the coding scheme would not use any data structure in the data construct other than said one data structure; and
   using the generated data constructs in the initial content data instead of their corresponding selected portions to form the output content data.

2. The method of claim 1, wherein the mechanism of the coding scheme uses a predetermined first code and one or more predetermined second codes, such that a decoder for the coding scheme, upon decoding a quantity of data encoded according to the coding scheme, does not use data located between a first code and a corresponding following second code.

3. The method according to claim 2, wherein, for a given data structure in a data construct, the corresponding data that is encrypted using the corresponding encryption process commences with a second code so that, upon performance of the corresponding decryption process for said given data structure on the encrypted data in each data structure in that data construct, any data structure in that data construct preceding said given data structure occurs between a first code in the data construct and the decrypted second code in said given data structure.

4. The method according to claim 3, wherein for the given data structure, the second code is part of the version of the selected portion corresponding to the given data structure.

5. The method according to claim 2, wherein each data construct comprises a first code that precedes all of the data structures for that data construct.

6. The method according to claim 2, wherein for a given data structure in a data construct, the corresponding data that is encrypted using the corresponding encryption process terminates with a first code, so that, upon performance of the corresponding decryption process for said given data structure on the encrypted data in each data structure in that data construct, any data structure in the data construct following said given data structure occurs between the first code in said given data structure and a corresponding subsequent second code.

7. The method according to claim 6, wherein the subsequent second code is a second code in that data construct and located after all of the data structures in that data construct.

8. The method according to claim 6, wherein the subsequent second code is part of the initial content data following the selected portion corresponding to that data construct.

9. The method according to claim 2, wherein generating a data construct comprises:
   for each data structure in the data construct and each decryption process corresponding the other data structures in the data construct, determining whether performance of said decryption process on the encrypted data in said data structure would produce one or both of the first code and the second code and, if so, regenerating said data structure by performing one or both of:
      changing the encryption process for encrypting data in said data structure; and
      modifying the data that is encrypted in said data structure.

10. The method according to claim 1, wherein the mechanism of the coding scheme identifies said additional data as being one or more of: user data; auxiliary data; or data representing an extension to the coding scheme.

11. The method according to claim 1, in which:
   the initial data is a packetized data stream and the selected portions are each one or more packets of the packetized data stream; or
   the initial data comprises video data and the selected portions are each one or more of: one or more video frames; one or more video fields; a part of a video frame; or a part of a video field.

12. The method according to claim 1, comprising, for at least one data structure, modifying the corresponding selected portion to form the version of the selected portion for said at least one data structure.

13. The method according to claim 1, wherein the encryption processes for data structures of a data construct differ from each other by encryption keys used for the encryption processes and/or encryption algorithms used for the encryption processes.

14. A system arranged to generate, from initial content data, output content data for provision to one or more receivers, wherein the initial content data is encoded according to a coding scheme, wherein for a quantity of data encoded according to the coding scheme, the coding scheme provides a mechanism for including in the quantity of encoded data additional data such that a decoder for the coding scheme, upon decoding the quantity of encoded data, does not use the additional data to generate decoded data, the system comprising:
- a construct module arranged to generate, for each of one or more selected portions of the initial content data, a data construct that comprises a plurality of data structures, each data structure comprising data, including a version of the selected portion, that is encrypted using a corresponding encryption process different from each encryption process used to encrypt data in the other data structures, wherein the data construct is arranged such that using a decryption process that corresponds to the encryption process for one data structure on the encrypted data in each data structure in the data construct produces a quantity of data encoded according to the coding scheme that uses the mechanism so that a decoder for the coding scheme would not use any data structure in the data construct other than said one data structure; and
- a combiner module arranged to use the generated data constructs in the initial content data instead of their corresponding selected portions to form the output content data.

15. A head-end system comprising a system according to claim 14.

16. The system of claim 14, wherein the mechanism of the coding scheme uses a predetermined first code and one or more predetermined second codes, such that a decoder for the coding scheme, upon decoding a quantity of data encoded according to the coding scheme, does not use data located between a first code and a corresponding following second code.

17. The system according to claim 16, wherein, for a given data structure in a data construct, the corresponding data that is encrypted using the corresponding encryption process commences with a second code so that, upon performance of the corresponding decryption process for said given data structure on the encrypted data in each data structure in that data construct, any data structure in that data construct preceding said given data structure occurs between a first code in the data construct and the decrypted second code in said given data structure.

18. The system according to claim 17, wherein for the given data structure, the second code is part of the version of the selected portion corresponding to the given data structure.

19. The system according to claim 16, wherein each data construct comprises a first code that precedes all of the data structures for that data construct.

20. The system according to claim 16, wherein for a given data structure in a data construct, the corresponding data that is encrypted using the corresponding encryption process terminates with a first code, so that, upon performance of the corresponding decryption process for said given data structure on the encrypted data in each data structure in that data construct, any data structure in the data construct following said given data structure occurs between the first code in said given data structure and a corresponding subsequent second code.

21. The system according to claim 20, wherein the subsequent second code is a second code in that data construct and located after all of the data structures in that data construct.

22. The system according to claim 20, wherein the subsequent second code is part of the initial content data following the selected portion corresponding to that data construct.

23. The system according to claim 16, wherein the construct module is arranged to generate a data construct by:
for each data structure in the data construct and each decryption process corresponding the other data structures in the data construct, determining whether performance of said decryption process on the encrypted data in said data structure would produce one or both of the first code and the second code and, if so, regenerating said data structure by performing one or both of:
changing the encryption process for encrypting data in said data structure; and
modifying the data that is encrypted in said data structure.

24. The system according to claim 14, wherein the mechanism of the coding scheme identifies said additional data as being one or more of: user data; auxiliary data; or data representing an extension to the coding scheme.

25. The system according to claim 14, in which:
the initial data is a packetized data stream and the selected portions are each one or more packets of the packetized data stream; or
the initial data comprises video data and the selected portions are each one or more of: one or more video frames; one or more video fields; a part of a video frame; or a part of a video field.

26. The system according to claim 14, arranged to, for at least one data structure, modify the corresponding selected portion to form the version of the selected portion for said at least one data structure.

27. The system according to claim 14, wherein the encryption processes for data structures of a data construct differ from each other by encryption keys used for the encryption processes and/or encryption algorithms used for the encryption processes.

28. A tangible non-transitory computer readable medium storing a computer program which, when executed by a processor, causes the processor to carry out a method for generating, from initial content data, output content data for provision to one or more receivers, wherein the initial content data is encoded according to a coding scheme, wherein for a quantity of data encoded according to the coding scheme, the coding scheme provides a mechanism for including in the quantity of encoded data additional data such that a decoder for the coding scheme, upon decoding the quantity of encoded data, does not use the additional data to generate decoded data, the method comprising:
selecting one or more portions of the initial content data;
for each selected portion, generating a data construct that comprises a plurality of data structures, each data structure comprising data, including a version of the selected portion, that is encrypted using a corresponding encryption process different from each encryption process used to encrypt data in the other data structures, wherein the data construct is arranged such that using a decryption process that corresponds to the encryption process for one data structure on the encrypted data in each data structure in the data construct produces a quantity of data encoded according to the coding scheme that uses the mechanism so that a decoder for the coding scheme would not use any data structure in the data construct other than said one data structure; and using the generated data constructs in the initial content data instead of their corresponding selected portions to form the output content data.

* * * * *